(No Model.)

J. BREWER.
ANTI FRICTION JOURNAL BOX.

No. 408,288. Patented Aug. 6, 1889.

Witnesses
H. S. Smith
L. F. Wilbur

Inventor
James Brewer
By his Attorney A. J. O'Brien

UNITED STATES PATENT OFFICE.

JAMES BREWER, OF DENVER, COLORADO.

ANTI-FRICTION JOURNAL-BOX.

SPECIFICATION forming part of Letters Patent No. 408,288, dated August 6, 1889.

Application filed April 12, 1889. Serial No. 306,950. (No model.)

*To all whom it may concern:*

Be it known that I, JAMES BREWER, a citizen of the United States of America, residing at Denver, in the county of Arapahoe and State of Colorado, have invented certain new and useful Improvements in Anti-Friction Journal-Boxes, of which the following is a specification, reference being had therein to the accompanying drawings.

My invention relates to an improved form and construction of anti-friction journal-boxes of that type in which the main shaft is supported by and rotates upon rollers, themselves capable of rotation in a proper cage or case; and its objects are to produce a bearing of such type in which friction shall be reduced to a minimum, danger of disarrangement, displacement, and loss of parallelism of the rollers shall be avoided, and they be reliably maintained in their proper positions relatively to each other and to the main shaft; a journal-box adapted for use either as an intermediate or as a terminal bearing for a shaft, in which provision is made for an end or longitudinal thrust or movement of the main shaft, so that it may be particularly well fitted for use with the axles of railway and other cars and vehicles, of comparatively simple and economical construction in view of the utility thereof and results attained thereby, reliable, durable, and efficient in operation; to which ends it consists in the features, constructions, and combinations more particularly hereinafter described and claimed.

Figure 1:
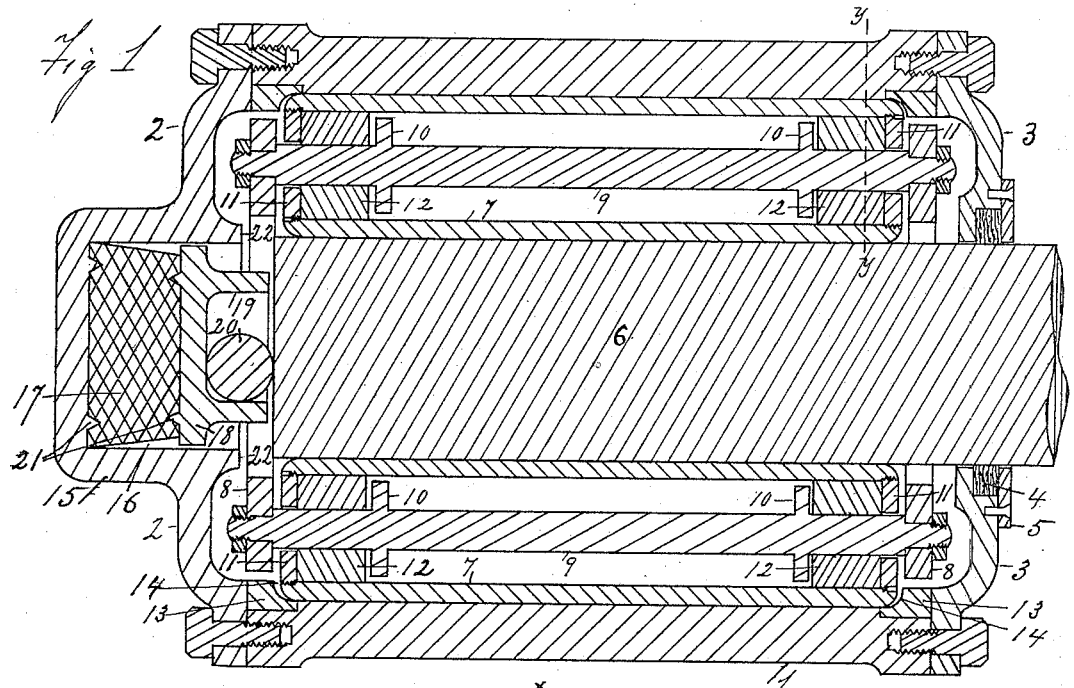
Figure 2:
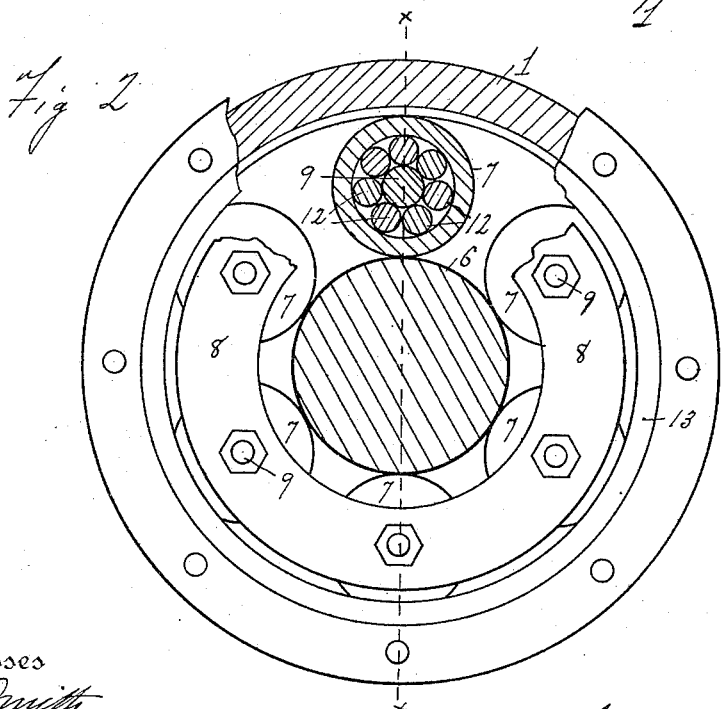

In the drawings is illustrated an embodiment of the invention, wherein Figure 1 is a central longitudinal section of my improved journal-box, taken on the line $x\ x$ of Fig. 2. Fig. 2 is an end view of the same with the end cap of the case removed, and with an upper part broken away to show a bearing-roller in section on the line $y\ y$ of Fig. 1.

In the drawings, the reference-numeral 1 indicates the exterior case or shell of the bearing or journal-box finished on its interior as a true cylinder. Secured to the ends thereof, by bolts or other suitable fastening devices, are the heads 2 3, the former of which, when the box is used as a terminal bearing, being of a peculiar construction hereinafter described. The cap 3 is formed with a central aperture permitting the passage therethrough and into the box of the main shaft 6. When it is desired to thoroughly protect the bearings within the case and prevent the access thereto of grit, dirt, &c., the cap 3 may be recessed around its central aperture and a suitable packing or packing-gland be secured therein, fitting snugly around the shaft, the cap being herein shown as having a shouldered recess in which is seated the packing ring or gland 4, retained in position by the ring-plate 5, secured thereover to the cap.

Within the box the shaft 6 is surrounded and supported by a series or plural number of tubular rollers 7 of such diameter that they contact with or impinge at diametrically-opposite points against the shaft 6 and the interior surface of the casing. Six of such tubular rollers, at some little distance apart, are herein shown as surrounding the shaft, but the number and size thereof and their distance apart may be varied, and so many may be used, or those that are used may be of such diameter that they approach quite closely to each other, or even touch, the essential thing, irrespective of size and number, being that they shall take both upon the shaft and the interior surface of the shell or cage. These tubular rollers are secured and maintained in their proper relative positions by bolts or rods 9 passing therethrough and attached at both ends to the traveling rings 8 8. These bolts are reduced at the ends for a distance sufficient to pass through the traveling rings, so that the latter may take against a shoulder at the inner end of such reduced portion, though such shoulder for the seating of the rings may be formed by a collar or other suitable stopping device secured upon an unreduced end of a bolt. The ends of the bolts being passed through suitable apertures in the traveling rings, the rings are clamped in position by nuts secured upon the ends of the bolts, or by riveting or any other known means, though the use of the nuts, as shown, is preferable, as giving greater facility for the ready assemblage or detachment of the parts. The tubular rollers 7 are closed at their ends by heads 11, screw-seated therein, the bolts passing through central apertures therein. These heads may be provided with a couple of holes each, or slots, by which a wrench or screw-driver may be applied thereto; but as such is a common and well-known expedient, it is not herein illustrated.

At a short distance proportionately from the ends of the bolts 9 collars 10 are formed with or secured to the bolts, forming at each end of each bolt, in connection with the heads 11 thereof, chambers or cages in which is placed a plural number of rollers 12, surrounding in each cage a bolt 9, and impinging thereupon and upon the inner periphery of the tubular roller. In Fig. 2 seven of such rollers 12 are shown around the bolt; but it is evident that the number and size thereof may be varied so long as enough thereof are used and of such size as to give a tubular roller 7 a rolling bearing on its bolt 9. The main rollers 7, the bolts 9, the lesser rollers 12, and the traveling rings 8, being secured together, as shown and described, form a cage of roller-bearings, which is placed within the casing 1 and secured therein by suitable end caps, the result being that a box is formed for a shaft 6, in which every bearing is a roller-bearing, and in which all the strain or stress put thereon by the shaft is transferred to the shell or case, and any support used therefor entirely by rolling contacts, which insure a minimum of friction and loss of power.

As there may be provision for some longitudinal movement of the shaft and its immediate bearings, or such movement may occur undesignedly, provision should be made to guard against any unnecessary wear thereby and to replace the parts apt necessarily to be the most worn. Wear from such cause would of course occur mainly at the ends; hence the ends of the casing within the caps are slightly concaved, say with a concavity that is or approaches a quadrant of a circle of suitable diameter, as shown at 14, the ends of the rollers 7 being correspondingly convexed or rounded, the space between the traveling rings 8 8 being somewhat greater than the length of the interposed rollers. This avoids the danger of angular corners grinding into the casing, or any part thereof. As, however, there will necessarily be some wear at the concaved bearing-points, it is preferable to form them in hardened or chilled rings 13, of iron or steel or other suitable wearing metal, that such bearing points may be easily renewed, the rings being held in end grooves in the casing by the caps or heads.

Where the box is to be used as an intermediate bearing—that is, one through which a shaft passes—both the heads or caps would be apertured, as is head 3, for such passage of the shaft, and the casing 1 may be made in two or more sections properly secured together by lugs or ears and bolts in the ordinary and well-known manner. The exterior of the case may be of such form and such contour in section as is best adapted for the peculiar position a particular box is to be used in, and may be secured in its proper position by lugs, brackets, or clips or by being placed in an exterior supporting-case, all as now practiced with many forms of bearings.

Where the box is to be used as the terminal bearing of a shaft—as, for instance, with a railway-car axle—provision should be made for end or longitudinal thrust or movement, for the which the peculiar cap 2 is well adapted. Such cap has a central exteriorly-closed hub or projection 15, forming a recess 16 within the cap. The exterior form of such hub or projection is immaterial, the material thing being the recess or chamber 16, within which is placed any suitable spring, herein typified by the block-rubber spring 17, upon whose inner face takes the base of a cage or chamber for containing a ball-bearing. Such cage is formed of the base 18, from which projects inwardly the wall 19, forming the cage or chamber for the reception of the ball 20, against which takes the end of the shaft 6. Such chamber is of greater diameter than the ball, as shown, that the latter may roll around therein and be a true ball-bearing, for if the cage or chamber were only large enough to receive the ball and were centrally located the ball would simply turn therein on one axis as a pin, and not relieve the friction thereat to any appreciable extent. The walls of chamber 16 are carried inward to form a stop 22, or other suitable stop may be properly placed to limit the end movement of the axle. This construction gives play and opportunity for an endwise movement of the shaft equal to the distance of its end from the stops 22, while the end of the shaft is always maintained in contact with the ball-bearing 20.

It should have been noted that when the box is to be used as an intermediate bearing means may be used for preventing any longitudinal movement of the shaft in the box, and such means might be a collar or collars on the shaft or a ring-collar on the head of the box taking in a groove around the shaft.

All and any of the various component parts may be made of such materials as are best adapted for the functions and offices of such parts in the structure.

Having thus described my invention, what I claim is—

1. A journal-box consisting of a shell or casing, a plural number of main rollers located therein, an equal number of bolts, one for and passing through each main roller, traveling rings secured to the ends of the bolts and holding the main rollers in a cage-like structure, and two series of a plural number of small rollers within each main roller, one series at each end thereof and surrounding the bolt therein, substantially as set forth.

2. A journal-box consisting of a shell or casing, a plural number of main rollers therein, a cap at one end of the casing apertured for the passage of a shaft, and a closed cap at the other end thereof having an interior central recess or chamber, a spring seated therein, a cage or chamber located upon the spring, and a ball-bearing in and of less diameter than the cage or chamber, substantially as set forth.

3. A journal-box consisting of a shell 1, tubular rollers 7, having rounded ends engaging with correspondingly-concaved seats in the shell, traveling rings 8 8, bolts passing through rollers 7 and secured to the rings, smaller rollers within the rollers 7, and a cap or caps apertured for the passage of a shaft, substantially as set forth.

4. A journal-box consisting of a shell 1, tubular rollers 7, traveling rings 8 8, bolts 9, having shoulders or collars 10 and passing through the rollers and secured to the rings, smaller rollers 12 within the tubular rollers, a cap 3, apertured for the passage of a shaft 6, a closed cap 2, having chamber 16 on its interior, a spring seated in such chamber, a cage or chamber composed of base 18 and wall 19, seated on the spring, and a ball-bearing 20 in and of less diameter than its cage or chamber, substantially as set forth.

In testimony whereof I affix my signature in presence of two witnesses.

JAMES BREWER.

Witnesses:
L. F. WILBER,
B. L. POLLOCK.